VOLTAGE CONTROLLED RAMP AND PULSE GENERATOR

Filed Nov. 9, 1960

INVENTORS
ROBERT R. ATHERTON
JOHN P. STAPLES
BY
H. H. Losche
Paul S. Collignon
ATTORNEYS United States Patent Office 3,114,114

Patented Dec. 10, 1963

3,114,114

VOLTAGE CONTROLLED RAMP AND PULSE GENERATOR

Robert R. Atherton and John P. Staples, Indianapolis, Ind., assignors to the United States of America as represented by the Secretary of the Navy Filed Nov. 9, 1960, Ser. No. 68,319
2 Claims. (Cl. 331—111)
(Granted under Title 35, U.S. Code (1952), sec. 266)

The invention described herein may be manufactured and used by or for the Government of the United States of America for governmental purposes without the payment of any royalties thereon or therefor.

The present invention relates to a voltage controlled ramp generator and more particularly to a circuit which provides a ramp function voltage output having constant amplitude and having a slope and frequency proportional to input voltage.

Various devices have been employed in the past for generating sawtooth waveforms. One device employs the use of high resistance elements, and high voltages, and charges a capacitor to a small percentage of the voltage. However, the high voltage requirement makes this device undesirable.

Bootstrap ramp generators and Miller sawtooth generators have also been employed in the past as sawtooth generators, but both these devices are relatively complicated in structure, and also are not readily adaptable for producing outputs having frequencies proportional to an input voltage level. One such bootstrap circuit, using transistors, is shown in the patent to McVey 2,892,952 which issued June 27, 1957.

In the present invention, a timing capacitor, a unijunction transistor and a first resistor constitute a relaxation oscillator which generates a sawtooth waveform. A grounded base transistor is provided to act as a constant current source for the timing capacitor. When the voltage on the timing capacitor reaches a predetermined value, the unijunction transistor switches from a high impedance to a low impedance state, allowing the timing capacitor to be rapidly discharged through the first resistor. The cycle repeats at a rate determined by the charging rate of the timing capacitor.

It is therefore a general object of the present invention to provide an improved circuit that will produce a sawtooth waveform.

Another object of the present invention is to provide a circuit that will produce a ramp function voltage output which has a constant amplitude, but has a slope and frequency proportional to an input voltage.

Still another object of the present invention is to provide an improved ramp function generator that is relatively unaffected by temperature changes.

Other objects and advantages of the present invention will be readily appreciated as the same becomes better understood by reference to the following detailed description when considered in connection with the accompanying drawing wherein.

Figure 1:
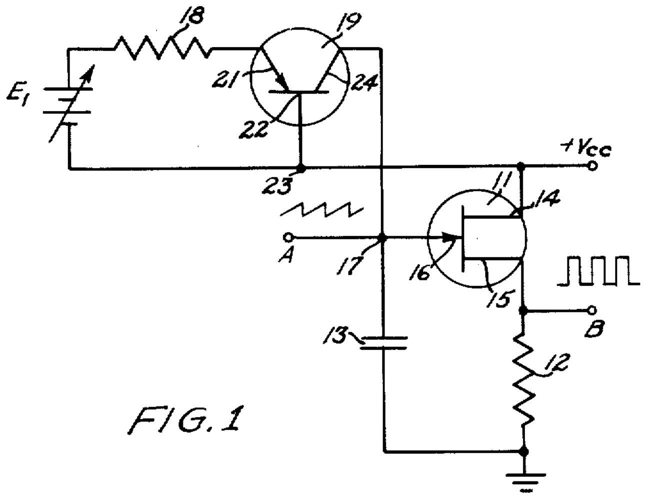
FIG. 1 is a schematic diagram of one embodiment of the invention.

Referring now to FIG. 1 of the drawing, unijunction transistor 11, resistor 12, and capacitor 13 constitute a relaxation oscillator. A unijunction transistor is a three-terminal semiconductor device having two ohmic contacts, which have been designated by numerals 14 and 15, and a single rectifying contact, called the emitter, which is designated by numeral 16. As shown in the drawing, capacitor 13 has one terminal connected to junction point 17 and the other terminal connected to ground. Resistor 12 is connected between ground and ohmic contact 15. Ohmic contact 14 is connected to a supply voltage ($V_{cc}$) and emitter 16 is connected to junction point 17.

Input voltage $E_1$, resistor 18, and transistor 19, which is operated in a grounded base configuration, form a constant current generator of extremely high output impedance which charges capacitor 13. Resistor 18 has one end connected to the emitter 21 of transistor 19 and the other end to the input voltage $E_1$. Base 22 is connected to junction point 23 which is common to the input voltage ($E_1$) and the supply voltage ($V_{cc}$). Collector 24 of transistor 21 is connected to junction point 17. When the voltage on capacitor 13 reaches a predetermined value, transistor 11 switches from a high impedance to a low impedance state and capacitor 13 is rapidly discharged through resistor 12. At this time, the stored energy of capacitor 13 appears as a pulse at point B and capacitor 13 starts to charge again. The cycle repeats at a rate determined by the charging rate of capacitor 13. The pulse formed by the rapid discharge of capacitor 13 may be used as a timing marker since it is coincident with the start of the ramp.

Since the input impedance of a grounded base transistor stage is extremely low, the load on the input voltage $I_c$, the direct current collector current is equal to $\alpha I_E$ where $\alpha$ is a constant depending on the particular transis- approximately equal to the value of the input voltage ($E_1$) divided by the value of resistor 18 ($R_{18}$). Since $I_c$, the direct current collector current is equal to $\alpha I_E$, where $\alpha$ is a constant depending on the particular transistor being used, $I_c$ is approximately equal to $E_1/R_1$, for high alpha valued transistors. The voltage accrued by capacitor 13 is governed by the fundamental expression:

$$E_c=\frac{1}{C}\int idt \quad (1)$$

and for constant current charging:

$$E_c=\frac{I_c t}{C} \quad (2)$$

where $E_c$ is capacitor voltage; $I_c$ is the capacitor charging current in amps; $t$ is time in seconds; and C is capacitance in farads.

Since $$I_c=E_1/R_{18} \quad (3)$$

Therefore:

$$E_c=\frac{E_1 t}{R_{18}C_{13}} \quad (4)$$

Figure 2:
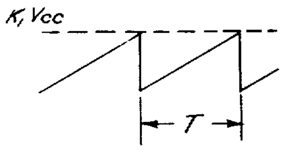
FIG. 2 is a graphical illustration of a sawtooth waveform generated by the present invention.

Equation 4 shows that the voltage accrued by capacitor 13 is a linear function of time. Since the voltage $E_c$ is equal to $K_1V_{cc}$ where $K_1$ is a constant, when transistor 11 fires:

$$K_1V_{cc}=\frac{E_1 T}{R_{18}C_{13}} \quad (5)$$

where T is the period of the sawtooth, as shown in FIG. 2 of the drawing. Solving Equation 5 for T gives:

$$T=\frac{K_1V_{cc}R_{18}C_{13}}{E_1} \quad (6)$$

and since the repetition frequency of the sawtooth is the reciprocal of the period, then:

$$f=\frac{E_1}{K_1V_{cc}R_{18}C_{13}} \quad (7)$$

Equation 7 shows that the frequency of the sawtooth oscillations are directly proportional to the input voltage.

From FIGURE 2 of the drawing, it can be seen that the slope of the sawtooth waveform is:

$$\frac{dE}{dt}=\frac{K_1V_{cc}}{T} \tag{8}$$

and by substituting from Equation 5;

$$\frac{dE}{dt}=\frac{E_1}{R_{18}C_{13}} \tag{9}$$

Equation 9 shows that the slope of the sawtooth waveform is directly proportional to input voltage.

Equations 1 through 9 have been developed neglecting the effects of leakage current and emitter-base voltage variations of transistor 19. The inclusion of these two effects will cause the equations to be in error by an amount dependent upon the relative values of $E_1$ and $R_{18}$ compared to the transistor characteristics. In general, larger values of $E_1$ will tend to mask emitter-base voltage effects, and larger values of $E_1/R_{18}$ will tend to minimize leakage current effects.

Figure 3:
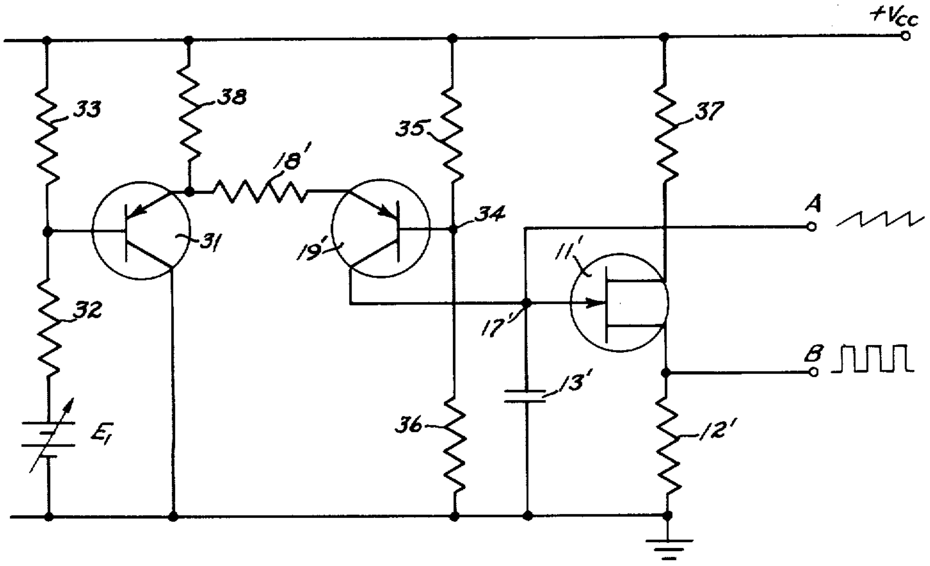
FIG. 3 is a schematic diagram of another embodiment of the invention having temperature stabilizing means.

Referring now to FIG. 3 of the drawing, there is shown a temperature stabilized version of a ramp generator. An additional P-N-P transistor 31 is provided and the two transistors 19' and 31 perform as an emitter coupled difference amplifier in order to minimize the effects of emitter-base voltage changes due to temperature variations. As shown, the base of transistor 31 is connected to the input voltage ($E_1$) through resistor 32 and to the supply voltage ($V_{cc}$) through resistor 33. The emitter of transistor 31 is coupled to the emitter of transistor 19' through resistor 18' and the collector of transistor 31 is connected to ground. The base of transistor 19' is connected to junction point 34, which is connected to the supply voltage ($V_{cc}$) and to ground through resistors 35 and 36, respectively. The collector of transistor 19' is connected to junction point 17', which is common to one side of capacitor 13' and to the emitter of unijunction transistor 11'. The base-two contact of unijunction transistor 11' is connected to the supply voltage ($V_{cc}$) through resistor 37 which is provided in order to stabilize the unijunction firing potential with temperature.

It can thus be seen that the present invention provides an improved circuit for generating a sawtooth waveform having constant amplitude and having slope and frequency proportional to input voltage.

Obviously many modifications and variations of the present invention are possible in the light of the above teachings. It is therefore to be understood that the invention may be practiced otherwise than as specifically described.

What is claimed is:

1. A circuit for generating a ramp function voltage output having constant amplitude and slope and frequency proportional to input voltage comprising: a first transistor having a base electrode, a collector electrode, and an emitter electrode; a variable voltage source connected between said base electrode and said emitter electrode; a unijunction transistor having an emitter and first and second ohmic contacts; a capacitor and a resistor connected in series between said first ohmic contact and a junction point common to said emitter of said unijunction transistor and said collector electrode; a second voltage source connected to said base of said first transistor and to said second ohmic contact; and an output circuit connected to said emitter of said unijunction transistor.

2. A circuit for generating a ramp function voltage as set forth in claim 1 wherein is included means for temperature stabilizing said circuit comprising a second transistor having a base electrode, a collector electrode and an emitter electrode, said emitter electrode of said first transistor being connected through a resistor to said emitter electrode of said second transistor.

References Cited in the file of this patent

UNITED STATES PATENTS

| | | |
|---|---|---|
| 2,826,699 | Suran | Mar. 11, 1958 |
| 2,968,770 | Sylvan | Jan. 17, 1961 |
| 3,010,078 | Stefanov | Nov. 21, 1961 |
| 3,026,485 | Suran | Mar. 20, 1962 |
| 3,060,388 | Ball et al. | Oct. 23, 1962 |

OTHER REFERENCES

Electronics "Differential Amplifier Features D-C Stability," vol. 32, No. 3, January 16, 1959; pages 60–62.

UNITED STATES PATENT OFFICE

CERTIFICATE OF CORRECTION

Patent No. 3,114,114 December 10, 1963

Robert R. Atherton et al.

It is hereby certified that error appears in the above numbered patent requiring correction and that the said Letters Patent should read as corrected below.

Column 2, lines 28 and 29, for "$I_C$, the direct current collector current is equal to $\alpha I_E$ where $\alpha$ is a constant depending on the particular transis-" read -- $E_1$ is approximately that of resistor 18. Therefore, $I_E$, the direct current emitter input current to transistor 19, is --.

Signed and sealed this 5th day of May 1964.

(SEAL)
Attest:
ERNEST W. SWIDER

Attesting Officer

EDWARD J. BRENNER
Commissioner of Patents